June 2, 1931.  R. BELLANTONI  1,808,449
SPEED CHANGING DEVICE FOR MOTOR CARS
Filed July 27, 1929   4 Sheets-Sheet 4

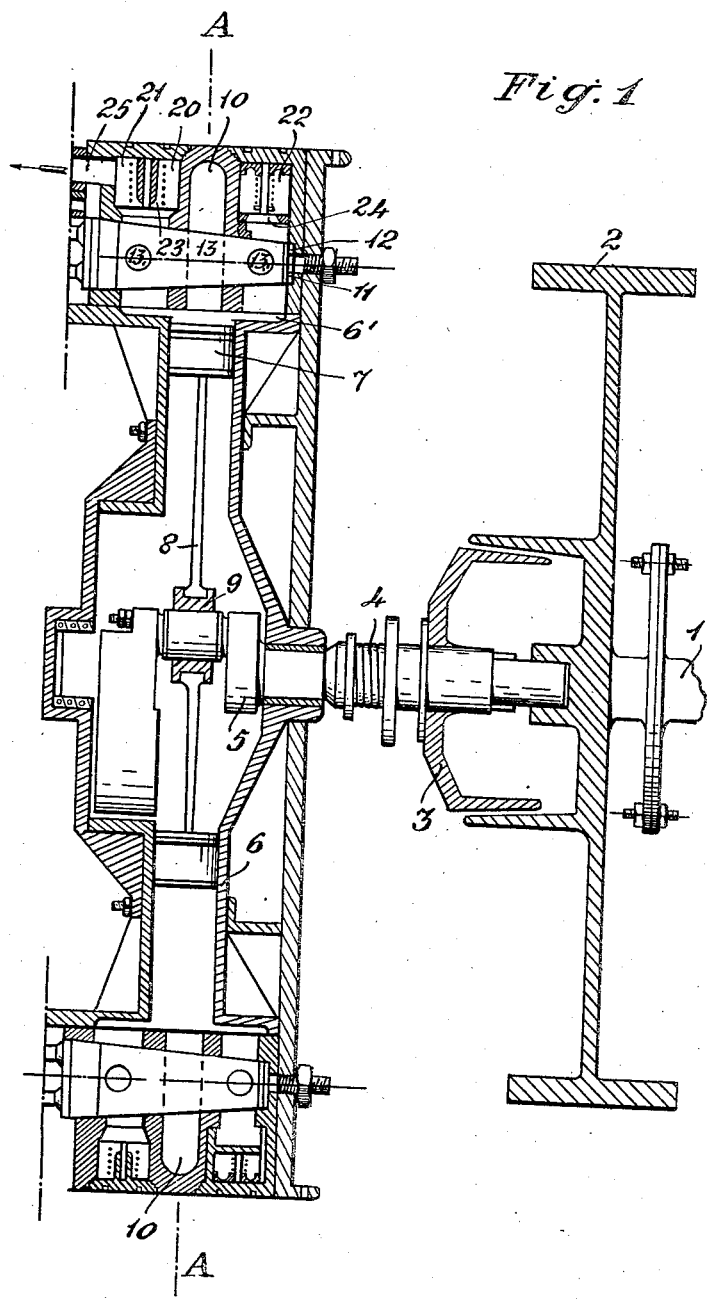

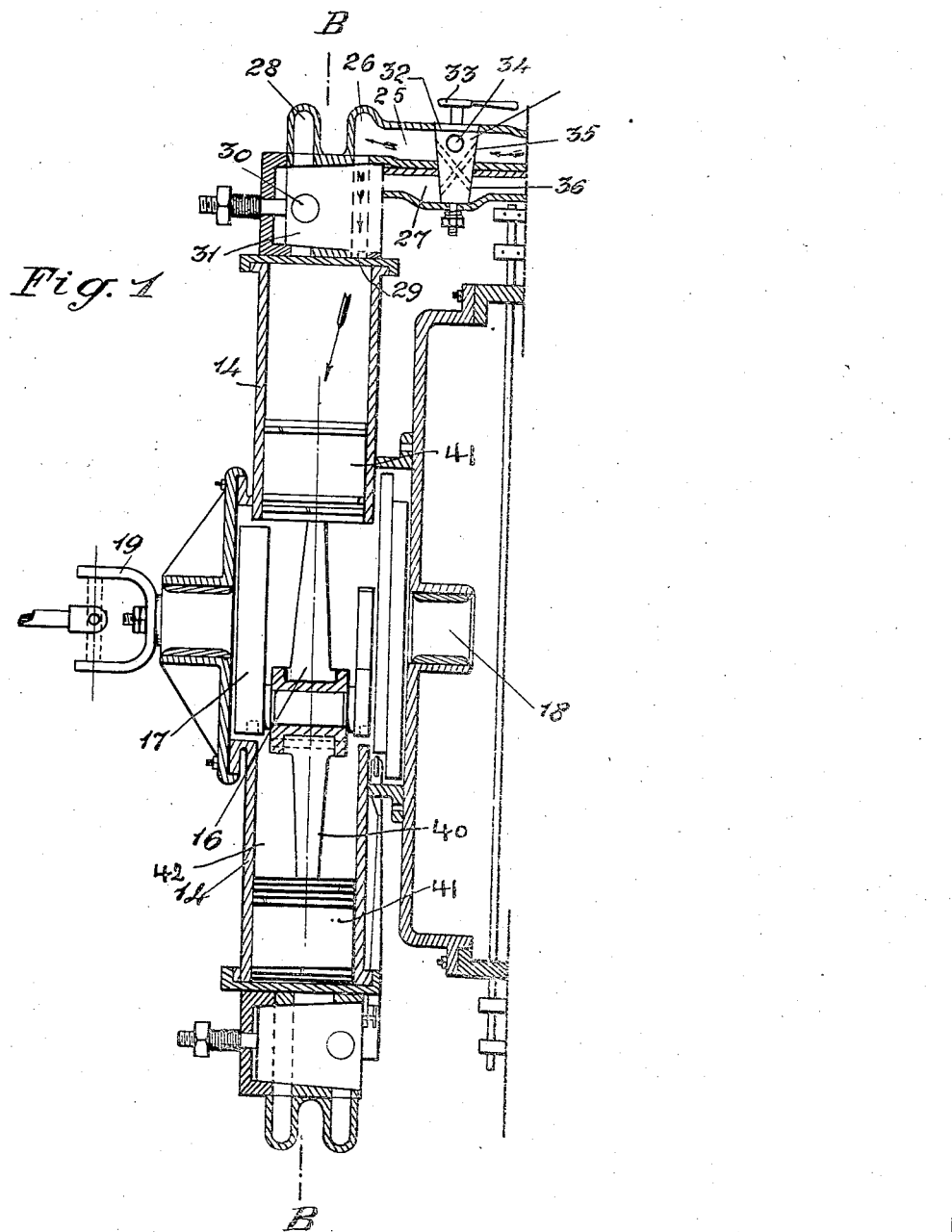

R. Bellantoni
INVENTOR

Patented June 2, 1931

1,808,449

UNITED STATES PATENT OFFICE

ROCCO BELLANTONI, OF ROME, ITALY

SPEED CHANGING DEVICE FOR MOTOR CARS

Application filed July 27, 1929, Serial No. 381,634, and in Italy July 27, 1928.

The invention relates to improvements in change speed gears for motor cars of any kind whatever and has for object the combination of a fluid compressor and a small motor which is actuated by the compressed fluid and is connected to the universal or Cardan joint, and adapted to rotate in one direction or the other according to the path into which said compressed fluid is sent.

Figure 2:
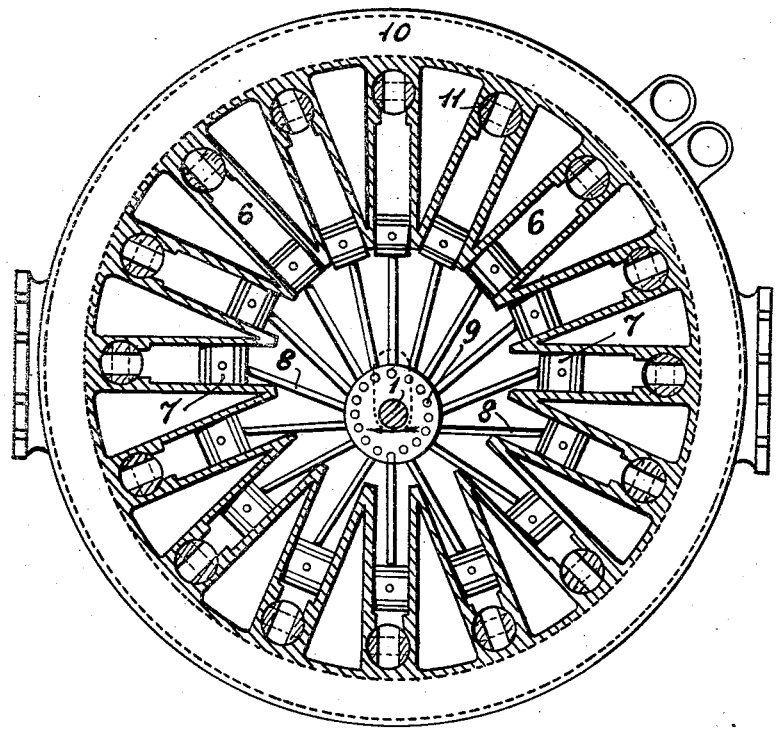
Figure 3:
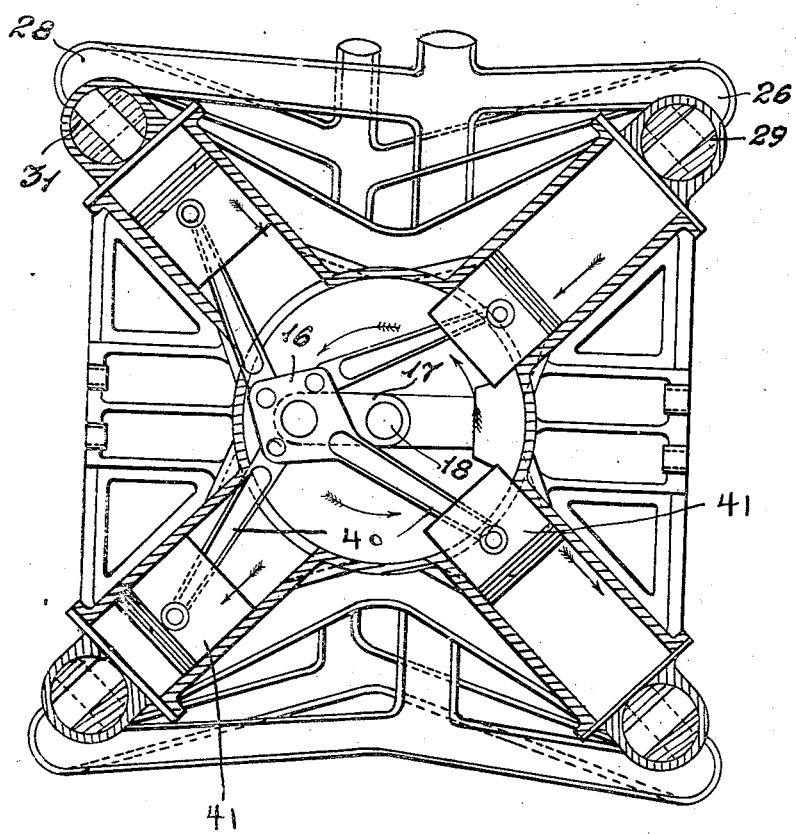

The device according to this invention is shown by way of example in the accompanying drawings, in which Fig. 1 is an axial sectional view of the device showing the main shaft, the fly wheel, the compres15 sor, the power transmitting motor and the Cardan joint; Fig. 2 is a cross sectional view of the compressor on the line A—A of Fig. 1, and Fig. 3 another sectional view on line B—B of Fig. 1.

In the drawings, 1 is the main crank shaft, 2 the fly wheel, 3 the friction clutch, with its pressing spring 4. 5 is the crank arm on which the compressor is rotatably mounted, which compressor, as shown in Fig. 2, is of the radial cylinder type of arrangement, that is, the compressor as seen in Fig. 2 consists of a casing having substantially the form of a disc, in which a plurality of cylindrical chambers 6 are ra30 dially formed, into each of which cylinders a piston 7 is reciprocally mounted, said cylinders 6 being arranged in one single plane as shown. The rods 8 of the pistons 7 are all pivotally connected to a collar 9 which is loosely mounted on the crank 5 of the crank shaft, so that the rotation of the main crank shaft 1, causes the pistons to effect their alternate strokes in the respective cylinders, so that air or liquid contained in said cyl40 inders, is compressed in the circumferentially arranged chamber 10, in the compressor casing.

At the outer end of each cylinder 6 and with its axis perpendicular to the plane of the cylinder casing of the compressor, is a tapered chamber 11 (Fig. 1) into which fits a tapered plug 12, having three ports or bores 13, 13', 13'', the port 13 having its axis perpendicular to the other two ports, which latter are parallel to one another.

All the plugs, which of course are as many as there are cylinders in the compressor, can be rotated through an angle of 90 degrees, and each plug is mechanically connected by any convenient means whatever to the diametrally opposed one, so that the rotation of the one plug causes a similar rotation of the diametrally opposed plug.

14 (Figures 1 and 3) is a small driven motor adapted to rotate in one direction or the other, and mounted on a separate shaft 18 having a crank 17 on which a collar 16 is loosely mounted, to which collar are pivotally connected the rods 40 of the pistons 41, which reciprocate in radially arranged cylindrical chambers 42 with which the said motor is supplied. The shaft 18 of this motor is connected in its turn to the Cardan or universal joint 19.

Parallel to the circumferential channel 10 in the compressor casing, and one on each side of the latter, there are two more circumferential channels 21, 22, the latter channels lying in the planes of the ports 13', 13'' respectively of the plug body 12 also for each cylinder 6—which communicates with the space 6'—are two ports which are normally shut by spring controlled valves 23 and 24, the chambers 21 being connected through a passage 25 with the circumferential channel 26 in the casing of motor 14, whilst the chambers 22 are connected through a passage 27 to the other circumferential channel 28 of said casing of motor 14.

Similarly to the compressor, at the outer end of each cylinder in the driven motor 14, and perpendicularly to the plane of said motor, is a tapered seating for a plug 31, having ports 29 and 30 with their axes perpendicular to one another.

The passages 25 and 27 to channels 26 and 28 respectively (Fig. 1) are intercepted by a plug 32, which, by means of a handle 33, can be rotated through an angle of 90°. This plug 32, has three ports 34, 35, 36, the port 34 being located near its upper end and in a direction perpendicular to its axis to afford a free passage for the air or liquid compressed by the compressor, along the channel 25. The other ports 35 and 36 of said plunger 32, are oppositely inclined with respect to the plunger axis, and do not communicate with each other. These ports are so arranged that their outer openings are in the plane of the channel 25, whilst their inner openings are in the plane of the channel 27. By this means liquid from one channel may be conducted into the other one, whenever plug 32 is properly adjusted, as is easily understood.

The operation of this device is as follows: On engagement of the friction clutch of the crank shaft, the compressor will rotate, but, as long as the plugs 12 are in the position as shown in Fig. 1, the air or fluid displaced by its pistons will freely circulate in the channel 10. But, as soon as the plugs 12 are rotated through an angle of 90°, admission to channel 10 will be stopped and the fluid substance passes from the chamber 6' into the channels 21 and 22 through ports 13', 13'' of plug 12, under the control of the spring controlled valves 23 and 24 whereby compression of the fluid is produced. The compressed fluid will therefore pass into channel 25 through port 34 of plug 32 and thence into channel 26 in the casing of the driven motor 14 and thence into the cylinders of said motor, which, in the alternate movements of the pistons in said cylinders, will cause the shaft of said motors to rotate and operate the Cardan joint of the transmission in one direction. On plug 32 being rotated through an angle of 90°, the compressed fluid will pass through its ports 35 and 36 to channel 27 and thence to the other channel 28 of the driven motor casing, so that the said driven motor will perform rotation in the opposite direction.

What I claim as new and as my invention and desire to secure by Letters Patent, is:

A power transmitting device for variable speed mechanisms including a plurality of compressing cylinders, pistons movable in said cylinders, a shaft, a collar on the shaft, radially disposed rods connecting the collar with the pistons, circumferential conduits arranged in parallel relation, and three-way plugs arranged in said conduits permitting the passage of fluid from one conduit to the other to permit the free circulation of fluid or the compression thereof, there being three separate circumferential channels in communication with the cylinders through the plugs, the plugs having three ports and the intermediate port corresponding to the middle circumferential conduit, the two other ports of the plugs corresponding with the other two circumferential channels, the first mentioned port being disposed perpendicularly with relation to the second mentioned ports.

In testimony whereof I have affixed my signature.

BELLANTONI, ROCCO.